(12) United States Patent
Watanabe et al.

(10) Patent No.: US 9,045,167 B2
(45) Date of Patent: Jun. 2, 2015

(54) VEHICLE BODY SIDE STRUCTURE

(71) Applicant: HONDA MOTOR CO., LTD., Minato-Ku, Tokyo (JP)

(72) Inventors: Yasunori Watanabe, Wako (JP); Kenichi Kitayama, Wako (JP); Shigeyuki Nagai, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/367,339

(22) PCT Filed: Oct. 30, 2012

(86) PCT No.: PCT/JP2012/077962
§ 371 (c)(1),
(2) Date: Jun. 20, 2014

(87) PCT Pub. No.: WO2013/094314
PCT Pub. Date: Jun. 27, 2013

(65) Prior Publication Data
US 2015/0123429 A1 May 7, 2015

(30) Foreign Application Priority Data

Dec. 21, 2011 (JP) ................................. 2011-280031

(51) Int. Cl.
*B60N 99/00* (2006.01)
*B62D 25/04* (2006.01)

(52) U.S. Cl.
CPC ..................... *B62D 25/04* (2013.01)

(58) Field of Classification Search
CPC ...................................................... B62D 25/04
See application file for complete search history.

(56) References Cited

U.S. PATENT DOCUMENTS

2008/0122251 A1* 5/2008 Okajima et al. ........... 296/146.9

FOREIGN PATENT DOCUMENTS

| JP | H06-16909 Y2 | 5/1994 |
| JP | 2011-088494 A | 5/2011 |
| JP | 2011-195107 A | 10/2011 |

* cited by examiner

*Primary Examiner* — Lori L Lyjak
(74) *Attorney, Agent, or Firm* — Carrier Blackman & Associates, P.C.; Joseph P. Carrier; William D. Blackman

(57) ABSTRACT

A vehicle body (12) includes: a coupling recess (35) that couples an outer bottom member (42) with an outer top member (41) of an outer panel (37) of a vehicle body pillar (21); and a door seal cover (34) that covers the coupling recess (35). The door seal cover (34) comprises: a U-shaped body part (43) that has a U-shaped cross section and serves as a central portion; a U-shaped top lip (44) that extends upward from the body part (43); and a U-shaped bottom lip (45) that extends downward from the body part (43). A front top leading end (57), a front bottom leading end (58), a back top leading end (61), and a back bottom leading end (62) of seal contact surface sections (51, 54), which are firmly attached to door-side seal members (48, 49), are formed at step-free thicknesses.

5 Claims, 9 Drawing Sheets

VEHICLE BODY SIDE STRUCTURE

TECHNICAL FIELD

The present invention relates to a vehicle body side structure including a door seal cover for covering a coupling portion on a surface of a vehicle formed by coupling a plurality of outer panels.

BACKGROUND ART

Among vehicle body side structures, there is a structure for coupling a portion extending from a roof to an upper portion of a center pillar (see Patent Literature 1, for example). A center pillar is plastically formed as a separate body by using a high tension steel plate, a roof rail is plastically formed by using a normal steel plate, and a vehicle body outer panel coupling portion couples the center pillar and the roof rail near the roof rail. In a vehicle body in which the coupled portions are covered, respective pillars such as a center pillar are divided into upper and lower two portions. Step portions are formed at boundary portions where the upper portions and the lower portions are coupled and seal tape is stuck to the step portion, with which a seal member provided to a door comes in contact, out of the step portions (see Patent Literature 2, for example).

However, an outward appearance of the vehicle body outer panel coupling portion disclosed in Patent Literature 1 is not good, because a step is formed by a plate material laid on the coupling portion between the upper portion of the center pillar and the roof rail or a welding mark remains.

In the side structure disclosed in Patent Literature 2, the seal tape is stuck only to a position corresponding to the seal member provided to the door and therefore seal tape does not exist at the remaining step portions. In this manner, the step portions formed at the coupling portions are exposed and remain, which detracts from the appearance. If large seal tape adapted to the remaining step portions is used to cover the remaining step portions, a thin edge of the seal tape (door seal cover) corrugates and it is difficult to carry out the operation. Moreover, the thin edge of the seal tape (door seal cover) may not uniformly come in contact, which detracts from appearance.

PRIOR ART LITERATURE

Patent Literature

Patent Literature 1: JP 2011-195107 A
Patent Literature 2: JP 2011-88494 A

SUMMARY OF INVENTION

Technical Problem

It is an object of the present invention to provide a vehicle body side which facilitates a mounting operation of a door seal cover for covering a coupling recessed portion and improves appearance of the mounted door seal cover.

Solution to Problem

According to a first aspect of the present invention, there is provided a vehicle body side structure in which an outer panel, forming an outer face, of a vehicle body pillar supporting a roof of a vehicle body is formed by coupling an outer lower member to an outer upper member, the vehicle body side structure including: a coupling recessed portion where the outer lower member is coupled to the outer upper member; and a door seal cover for covering the coupling recessed portion, wherein the door seal cover has a U-shaped section and includes a U-shaped body at a central portion, a U-shaped upper lip extending upward from the body portion, and a U-shaped lower lip extending downward from the body portion, the upper lip and the lower lip have tip ends to he respectively laid on the outer upper member and the outer lower member, of the tip ends, tip end portions of seal close contact face portions to be held in close contact with door-side seal members of a door of the vehicle body are formed to have a non-stepped thickness so as to prevent the door-side seal member from separating from the outer upper member and the outer lower member while remaining tip end portions are formed to have a stepped thickness.

In a second aspect of the invention, preferably, the outer panel has a U-shaped section and the upper lip and the lower lip have thicknesses gradually reducing from the body portion toward the tip ends.

In a third aspect of the invention, preferably, the remaining tip end includes a gradually changing tip end thickness portion having a thickness gradually increasing in a direction away from the tip end of the seal close contact face portion and a constant tip end thickness portion. continuous with the gradually changing tip end thickness portion and having a constant thickness.

In a fourth aspect of the invention, preferably, the door seal cover has a front end and a rear end continuous with the tip end of the upper lip and continuous with the tip end of the lower lip, the front end and the rear end covered with respective door opening seals provided to a front door opening edge and a rear door opening edge of the vehicle body.

In a fifth aspect of the invention, preferably, the upper lip and the lower lip have seal outer wall thickness adjusting areas continuous with the seal close contact face portion, each of the seal outer wall thickness adjusting areas has a gradually changing wall thickness portion having a wall thickness gradually increasing in a direction away from the seal close contact face portion and toward the body portion and an intermediate gradually changing wall thickness portion continuous with the gradually changing wall thickness portion and having a wall thickness gradually increasing toward the body portion, and the gradually changing wall thickness portion has a boundary portion with the seal close contact. face portion, the boundary portion forming a triangular area substantially orthogonal to the tip end.

Advantageous Effects of Invention

In the first aspect of the invention, when the door seal cover is mounted to the outer panel in order to cover the coupling recessed portion with the door seal cover, the tip ends for coming in contact with the outer panel are not entangled and it is possible to prevent the entanglement. In other words, a mounting operation of the door seal cover becomes easy.

Moreover, because the remaining tip end has such a thickness as to form the step, rigidity of the door seal cover increases to thereby prevent corrugating deformation of the tip end of the seal close contact face portion after the door seal cover is taken out of a die for molding resin. As a result, the corrugating deformation of the tip end of the seal close contact face portion does not occur when the door seal cover is mounted to the vehicle body pillar, which improves an appearance.

In the second aspect of the invention, the outer panel has the U-shape section and the upper lip and the lower lip have thicknesses gradually reducing from the body portion toward the tip ends. Therefore, the thickness is the largest at the body portion and gradually reduces in directions away from the body portion, only the tip end of the seal close contact face portion has the thickness without the step, and it is possible to secure rigidity of the door seal cover. As a result, it is possible to maintain the U-shaped section, which facilitates the operation for setting the door seal cover on the U-shaped outer panel.

In the third aspect of the invention, the remaining tip end includes the gradually changing tip end thickness portion having a thickness gradually increasing in a. direction away from the tip end of the seal close contact face portion and the constant tip end thickness portion continuous with the gradually changing tip end thickness portion and having the constant thickness. Therefore, the thicknesses of the tip ends of the door seal cover change smoothly from the tip end having the thickness without the step to the constant tip end thickness portion and the thicknesses of the tip ends look uniform, which improves appearances of the tip ends and areas around the tip ends.

In the fourth aspect of the invention, the door seal cover has the front end and the rear end continuous with the tip end of the upper lip and continuous with the tip end of the lower lip, the front end and the rear end covered with the respective door opening seals provided to the front door opening edge and the rear door opening edge of the vehicle body side portion. Therefore, it is possible to suppress falling off of the door seal cover from the vehicle body pillar. Moreover, the front end and the rear end are hidden by the door opening seals, which improves the appearance.

In the fifth aspect of the invention, the upper lip and the lower lip have seal outer wall thickness adjusting areas continuous with the seal close contact face portion. Each of the seal outer wall thickness adjusting areas has the gradually changing wall thickness portion having a wall thickness gradually increasing in the direction away from the seal close contact face portion and toward the body portion and the intermediate gradually changing wall thickness portion continuous with the gradually changing wall thickness portion and having the wall thickness gradually increasing toward the body portion. The gradually changing wall thickness portion has the boundary portion with the seal close contact face portion and the boundary portion forms the triangular area substantially orthogonal to the tip end. Therefore, the door seal cover has a smooth outer face and the appearance is further improved.

DESCRIPTION OF EMBODIMENTS

A preferred embodiment of the present invention will be described in detail below with reference to the accompanying drawings.

Embodiment

Figure 1:
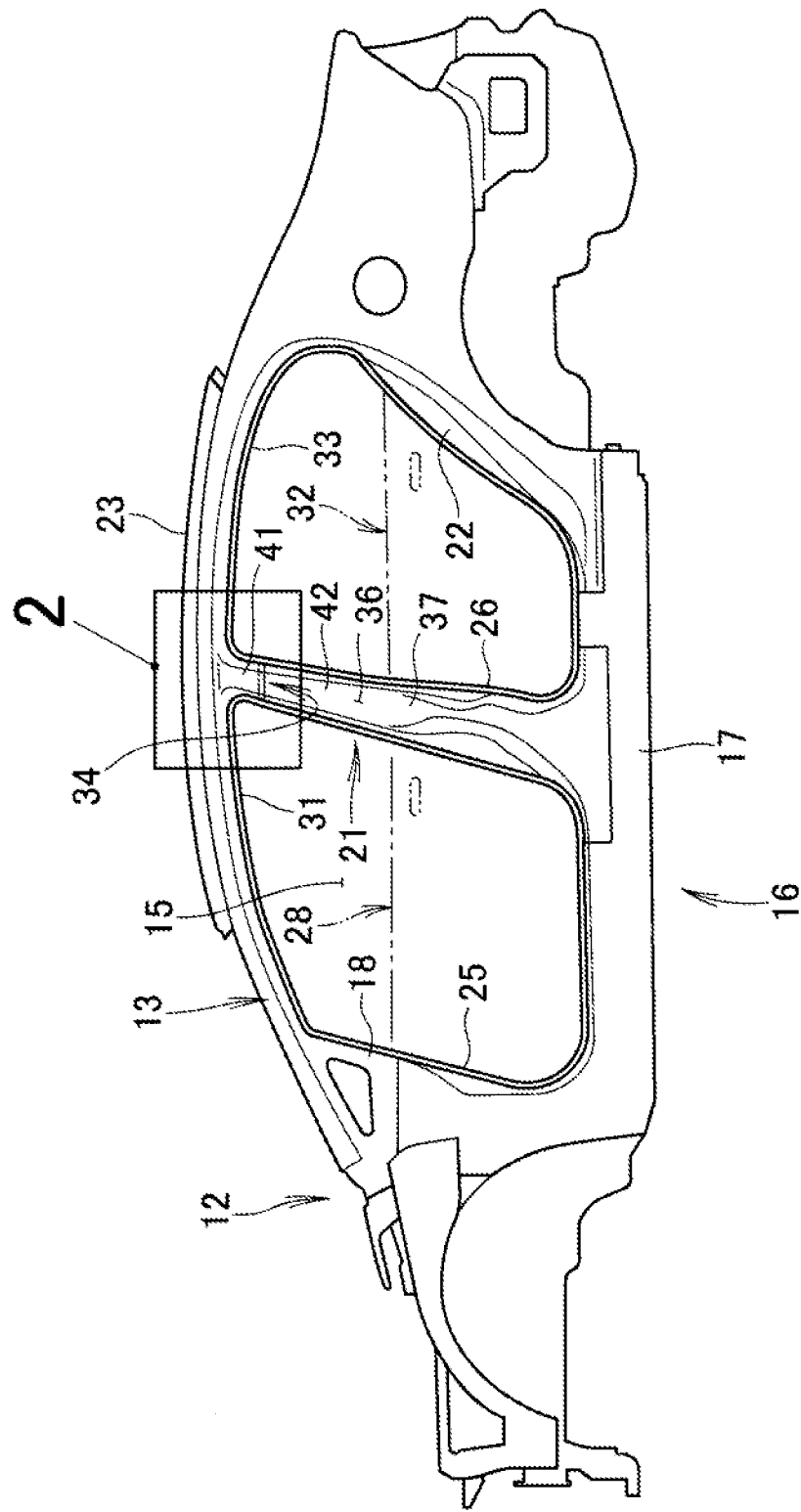
FIG. 1 is a side view illustrating a vehicle body employing a vehicle body side structure according to an embodiment of the present invention.
Figure 2:
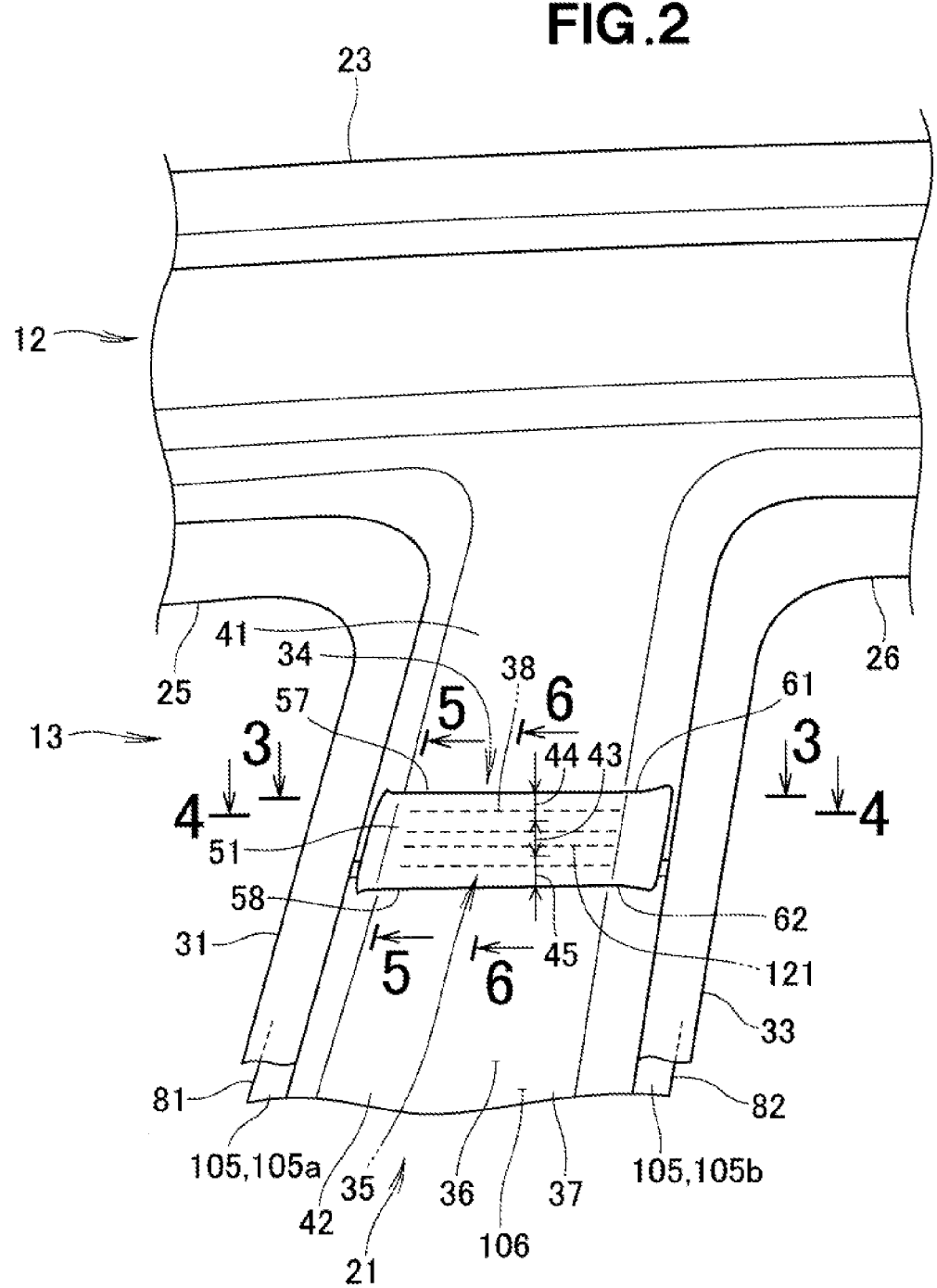
FIG. 2 is an enlarged view illustrating region 2 of FIG. 1.

As illustrated in FIGS. 1 and 2, a vehicle body 12 employs a vehicle body side structure according to the present embodiment. A side body 13 includes a side sill 17 forming an end portion of a floor (underbody) 16 of a vehicle interior 15, a front pillar 18 rising from the side sill 17, a center pillar 21, and a rear pillar 22 and supports a roof 23.

The vehicle body 12 has a front door opening portion 25 formed by the front pillar 18 and the center pillar 21 and a rear door opening portion 26 formed by the center pillar 21 and the rear pillar 22.

To the front door opening portion 25, a front door 28 and a. front door opening seal 31 are mounted. To the rear door opening portion 26, a rear door 32 and a rear door opening seal 33 are mounted.

Figure 9:
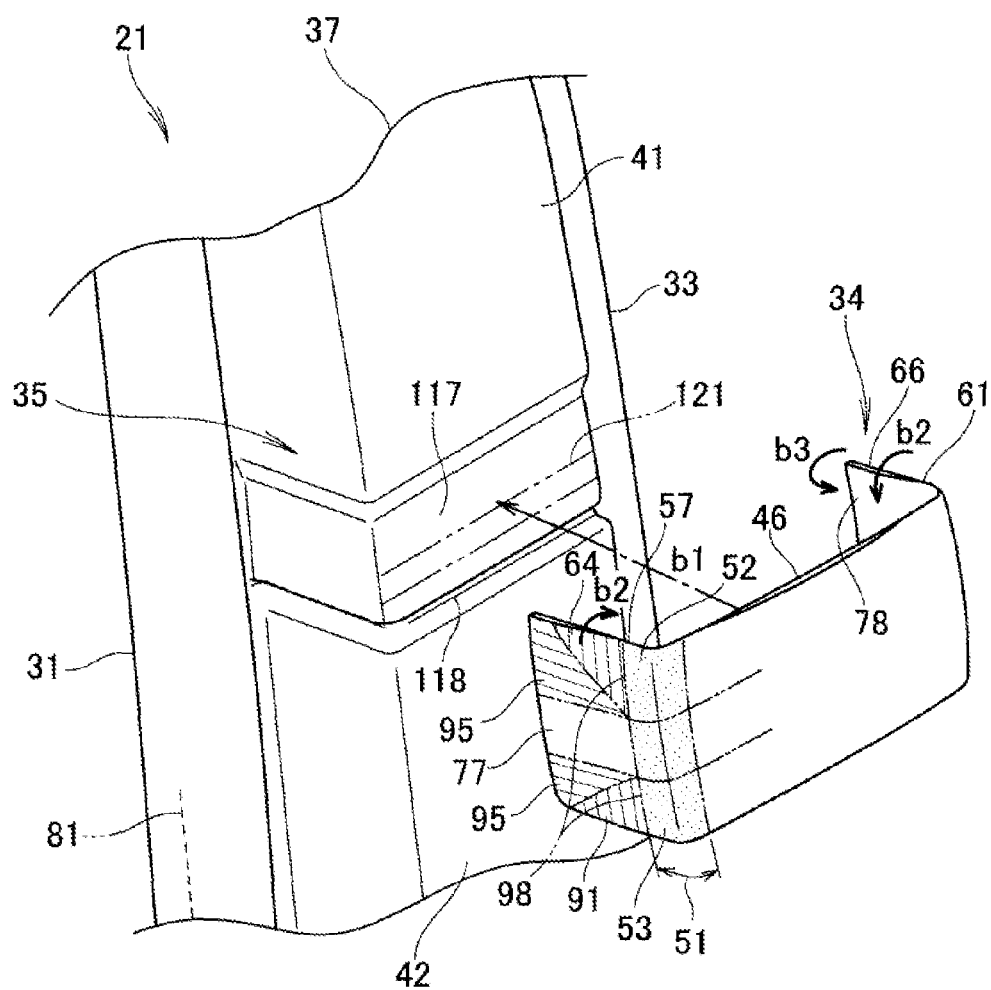
FIG. 9 is a schematic view illustrating the door seal cover in a mounted state.

In the side body 13 according to the embodiment, a door seal cover 34 is mounted to the center pillar 21 to cover a coupling recessed portion 35 (refer to FIG. 9 as well).

Next, a structure of the vehicle body side structure according to the embodiment will be described. As illustrated in FIG. 2, an outer panel 37 forming an outer face 36 of the center pillar 21 supporting the roof 23 of the vehicle body 12 is formed by connecting an outer lower member 42 to an outer upper member 41.

The side body 13 includes the coupling recessed portion 35 where the outer lower member 42 is connected to the outer upper member 41 and the door seal cover 34 for covering the coupling recessed portion 35.

As illustrated in FIGS. 3 to 7, the door seal cover 34 has a U-shaped section and includes a body portion 43 having a U-shaped central portion (FIG. 7), a U-shaped upper lip 44 extending upward from the body portion 43, and a U-shaped lower lip 45 extending downward from the body portion 43.

Figure 7:
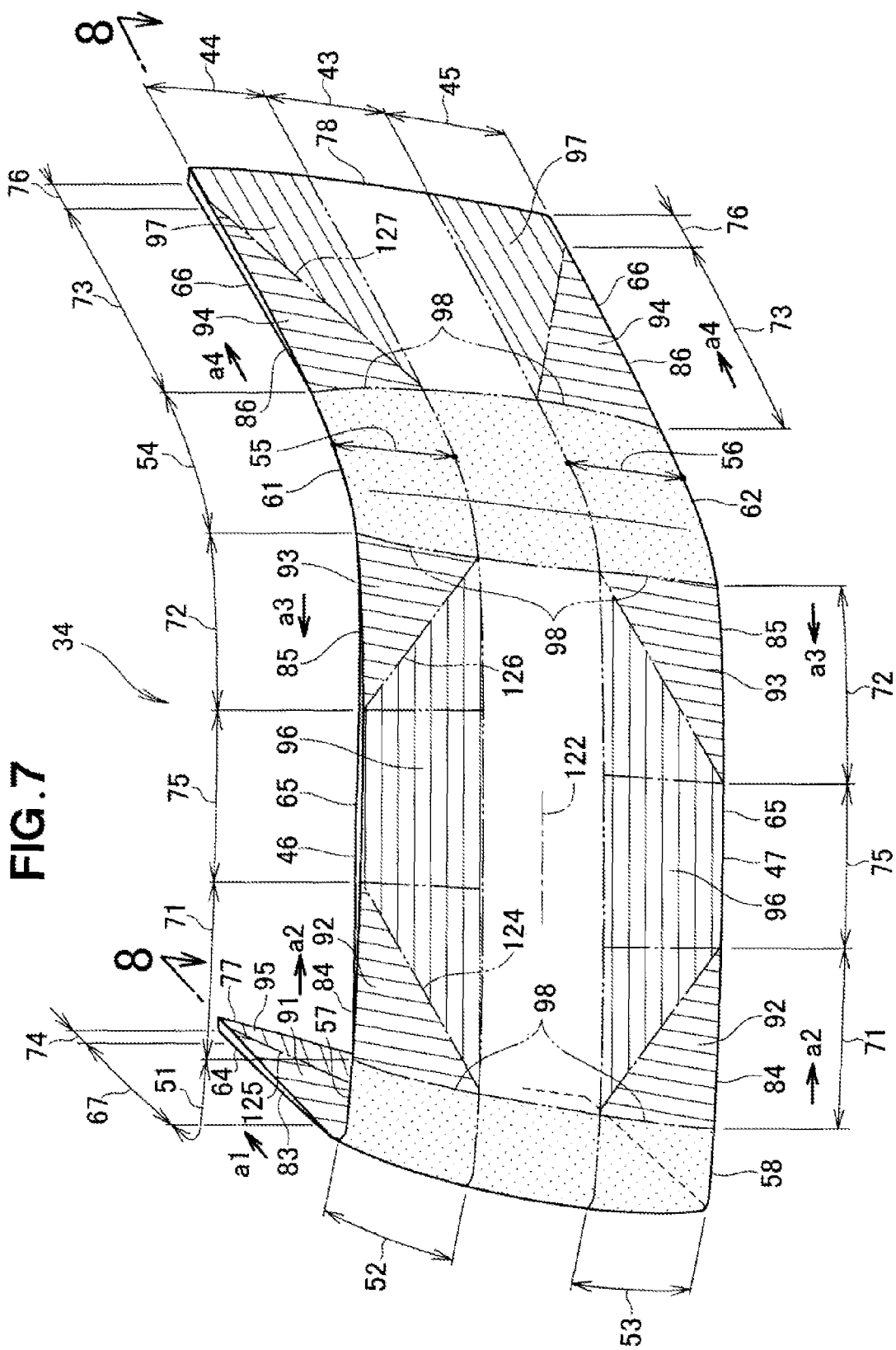
FIG. 7 is a perspective view illustrating a door seal cover according to the present embodiment.

As illustrated in FIG. 7, the upper lip 44 and the lower lip 45 respectively have tip end portions 46 and 47 to be laid on the outer upper member 41 and the outer lower member 42. Tip ends (a front upper tip end 57, a front lower tip end 58, a rear upper tip end 61, and a rear lower tip end 62) of seal close contact face portions 51 (a front upper seal close contact face portion 52, a front lower seal close contact face portion 53) (FIG. 7) and seal close contact face portions 54 (a rear upper seal close contact face portion 55 and a rear lower seal close contact face portion 56) to be in close contact with door-side seal members 48 and 49 (FIGS. 3 and 4) of the doors (the front door 28, the rear door 32) of the side body 13 are formed to have thicknesses without steps to prevent the door-side seal members 48 and 49 from separating from the outer upper member 41 and the outer lower member 42 (see FIG. 5).

Figure 6:
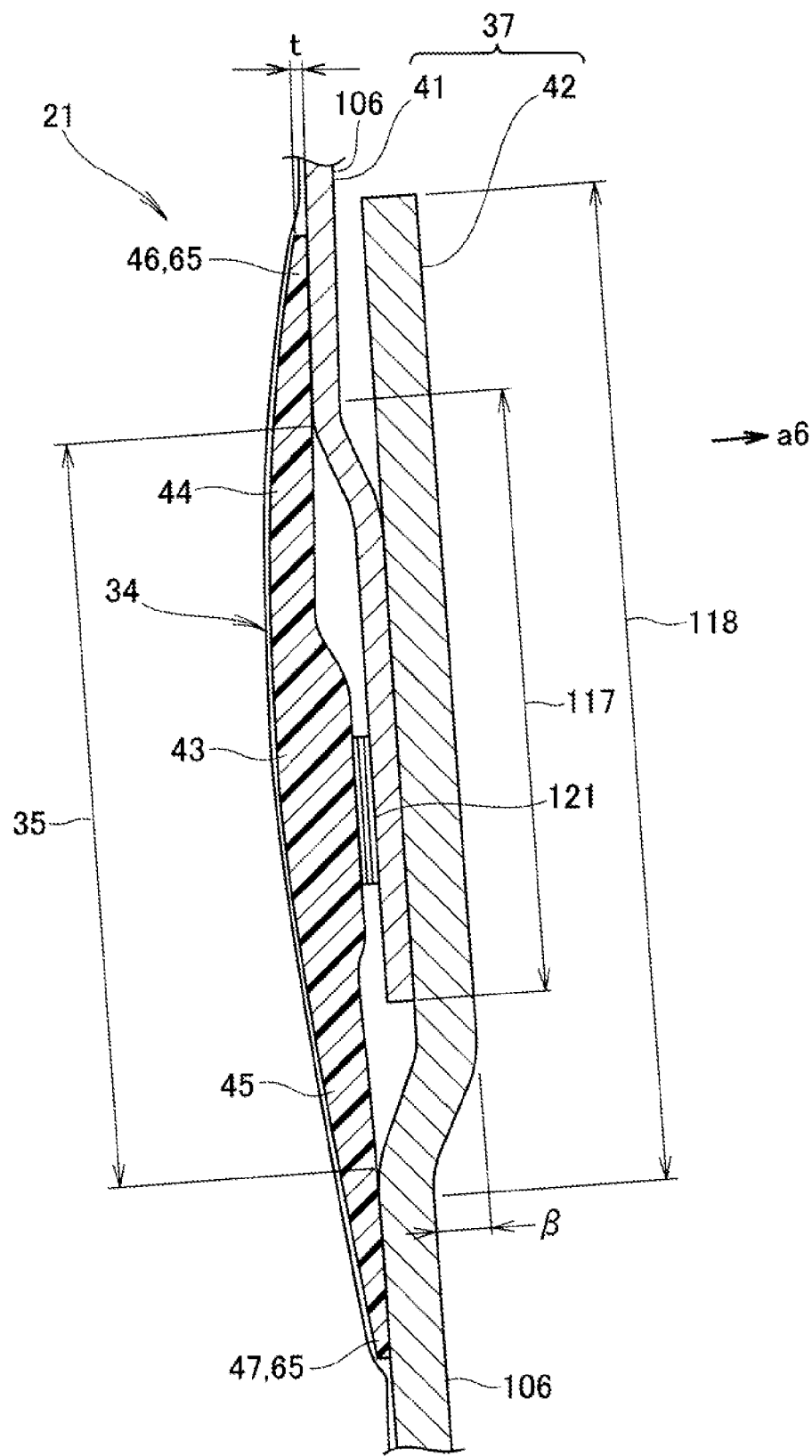
FIG. 6 is a cross-sectional view taken along line 6-6 of FIG. 2.

Remaining tip ends 64, 65, and 66 illustrated in FIG. 7 have thicknesses t (e.g., 0.5 mm) to form steps as illustrated in FIG. 6. As illustrated in FIGS. 7 and 9, the seal close contact face portions 51 and 54 are illustrated with dotted patterns.

Figure 3:
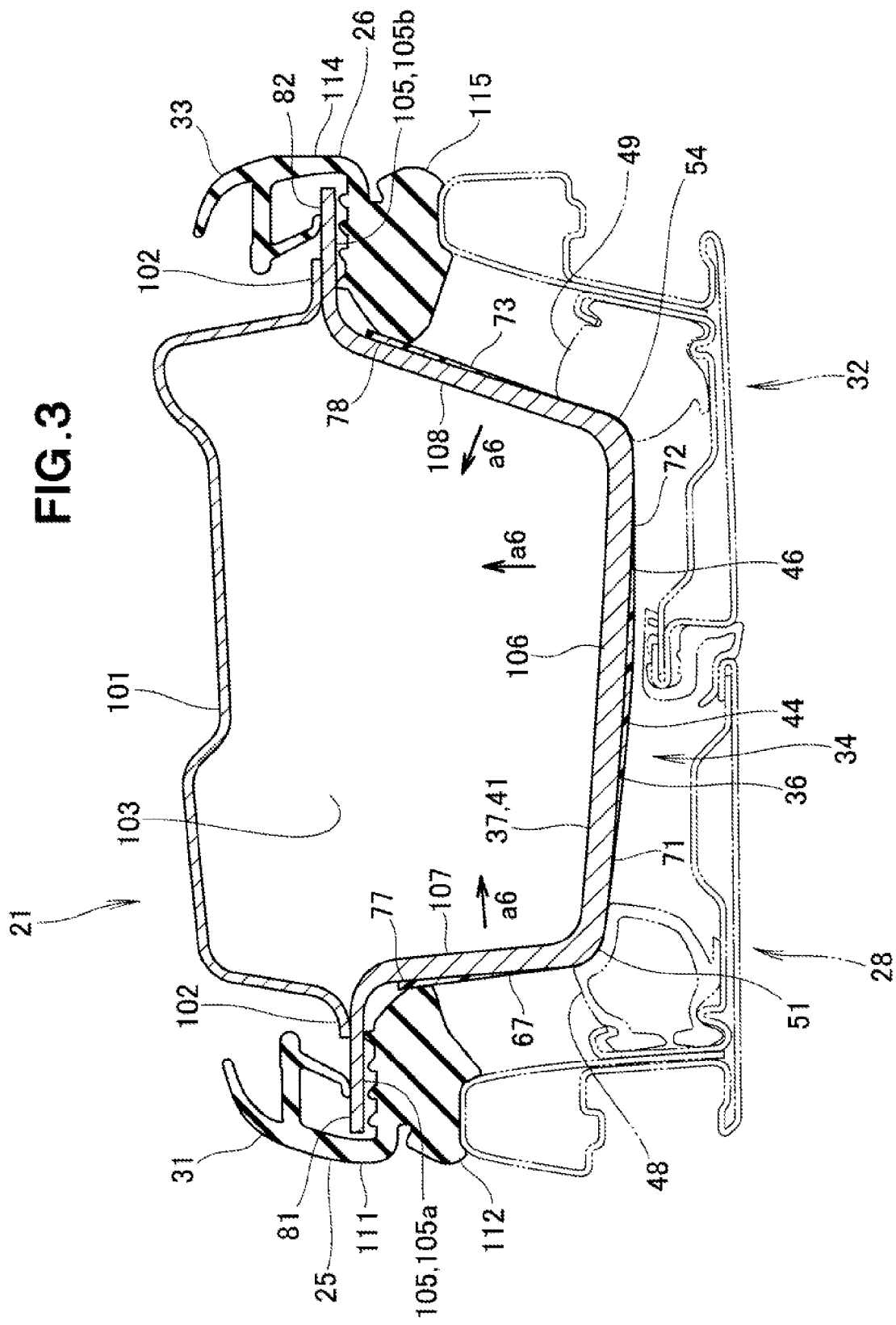
FIG. 3 is a cross-sectional view taken along line 3-3 of FIG. 2.
Figure 5:
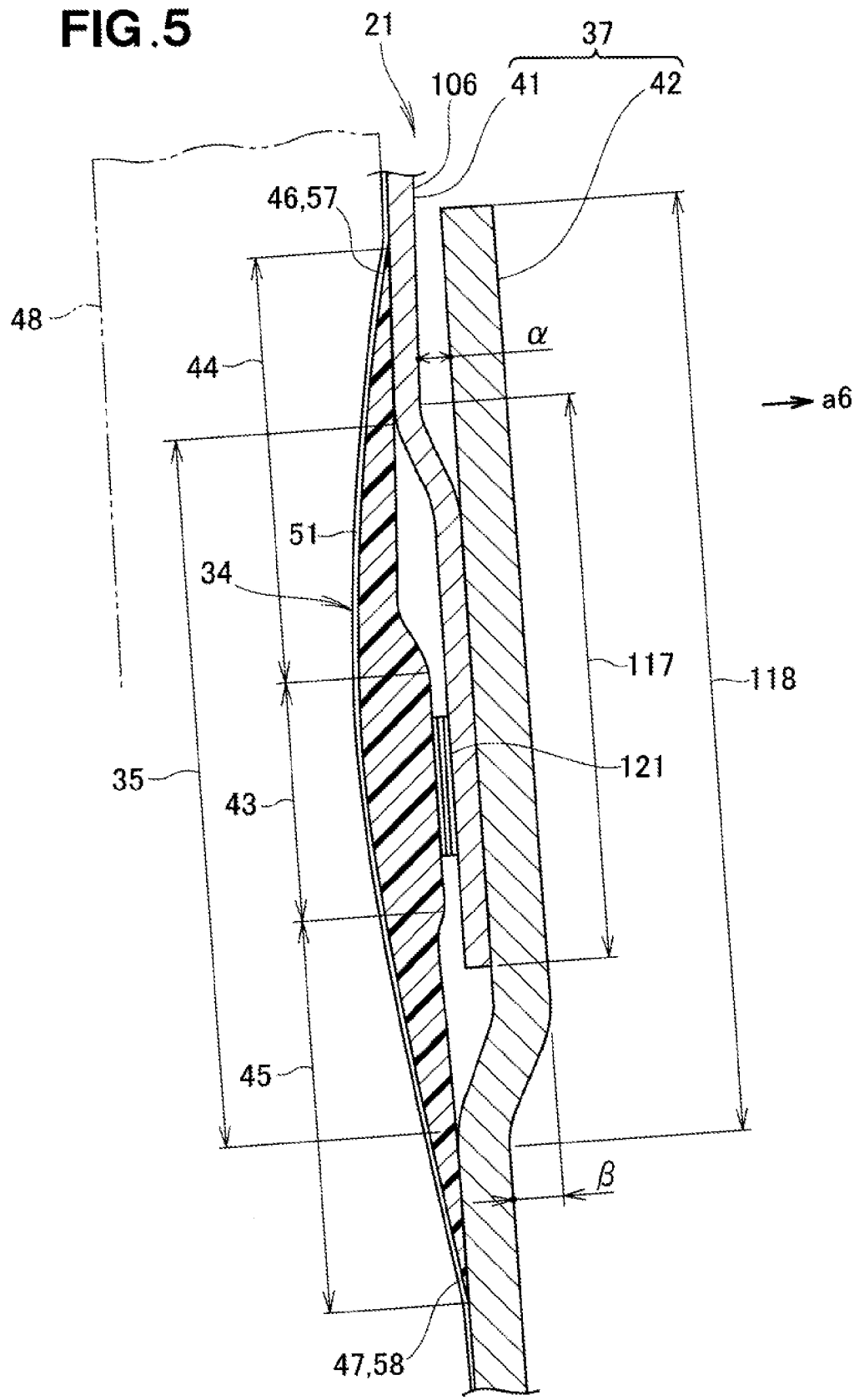
FIG. 5 is a cross-sectional view taken along line 5-5 of FIG. 2.

As illustrated in FIG. 3, the outer panel 37 has a U-shaped section, As illustrated in FIG. 5, thicknesses of the upper lip 44 and the lower lip 45 gradually reduce from the body portion 43 toward the tip ends 46 and 47.

The remaining tip ends 64, 65, and 66 illustrated in FIG. 7 have gradually changing tip end thickness portions 67, 71, 72, and 73 having thicknesses gradually increasing in directions (directions of arrows a1 to a4) away from the tip ends (the front upper tip end 57, the front lower tip end 58, the rear upper tip end 61, and the rear lower tip end 62) of the seal close contact face portions 51 (the front upper seal close contact face portion 52 and the front lower seal close contact face portion 53) and the seal close contact face portions 54 (the rear upper seal close contact. face portion 55 and the rear lower seal close contact face portion 56) and constant tip end thickness portions 74, 75, and 76 continuous with the gradually changing tip end thickness portions 67, 71, 72, and 73 and having constant thicknesses. In FIG. 7, the gradually changing tip end thickness portions 67, 71, 72, and 73 are illustrated with vertical striped patterns.

Figure 4:
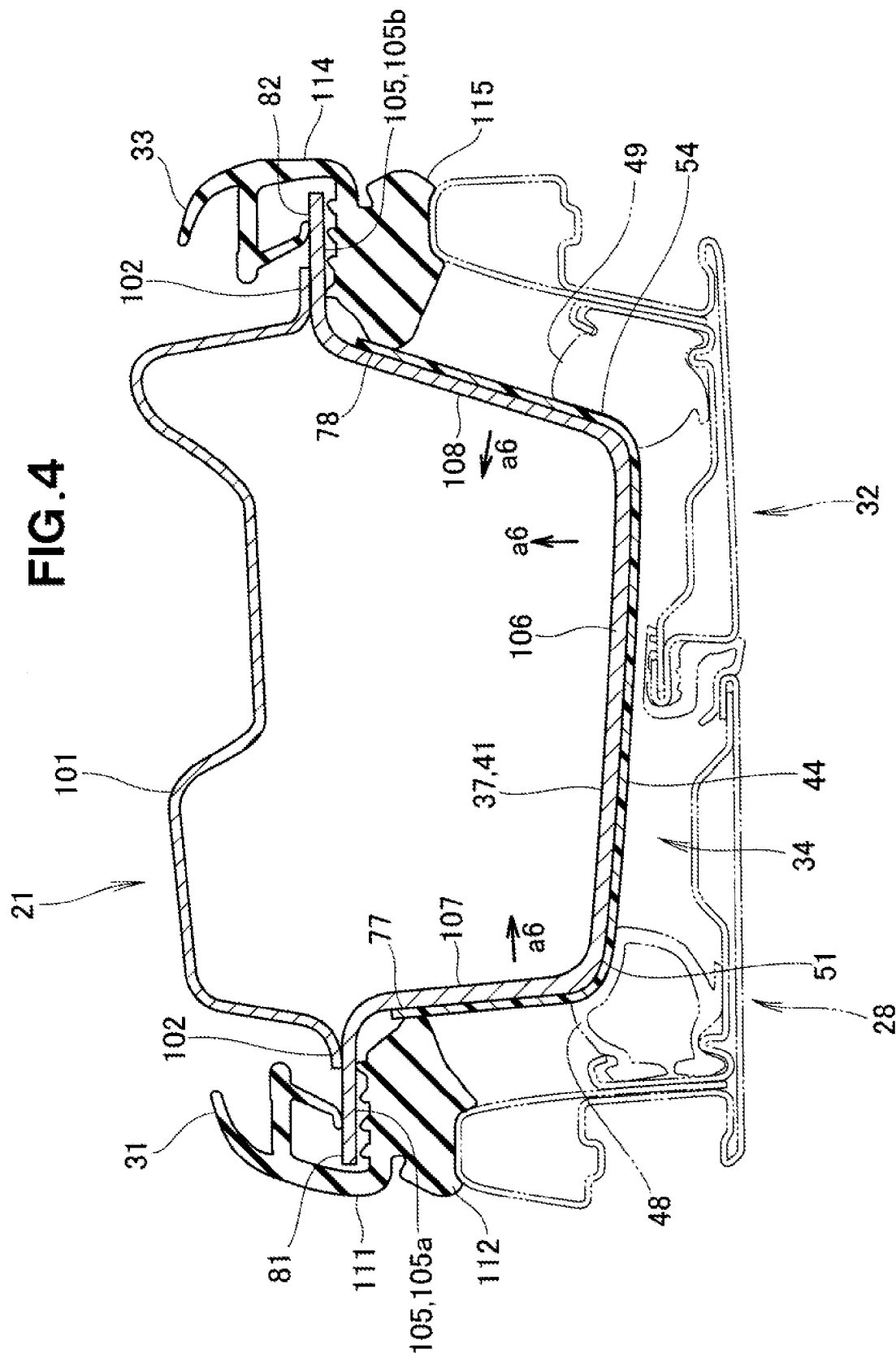
FIG. 4 is a cross-sectional view taken along line 4-4 of FIG. 2.

The door seal cover 34 has a front end 77 and a rear end 78 continuous with a tip end 46 of the upper lip 44 and continuous with a tip end 47 of the lower lip 45 and the front end 77 and the rear end 78 are covered with respective door opening seals (a front door opening seal 31 and a rear door opening seal 33) provided to a front door opening edge 81 (FIGS. 2, 3, and 4) and a rear door opening edge 82 of the side body 13 (FIGS. 3 and 4). The front door opening seal 31 and the rear door opening seal 33 covering the front end 77 and the rear end 78 extend in a vertical direction of the side body 13.

Figure 8:
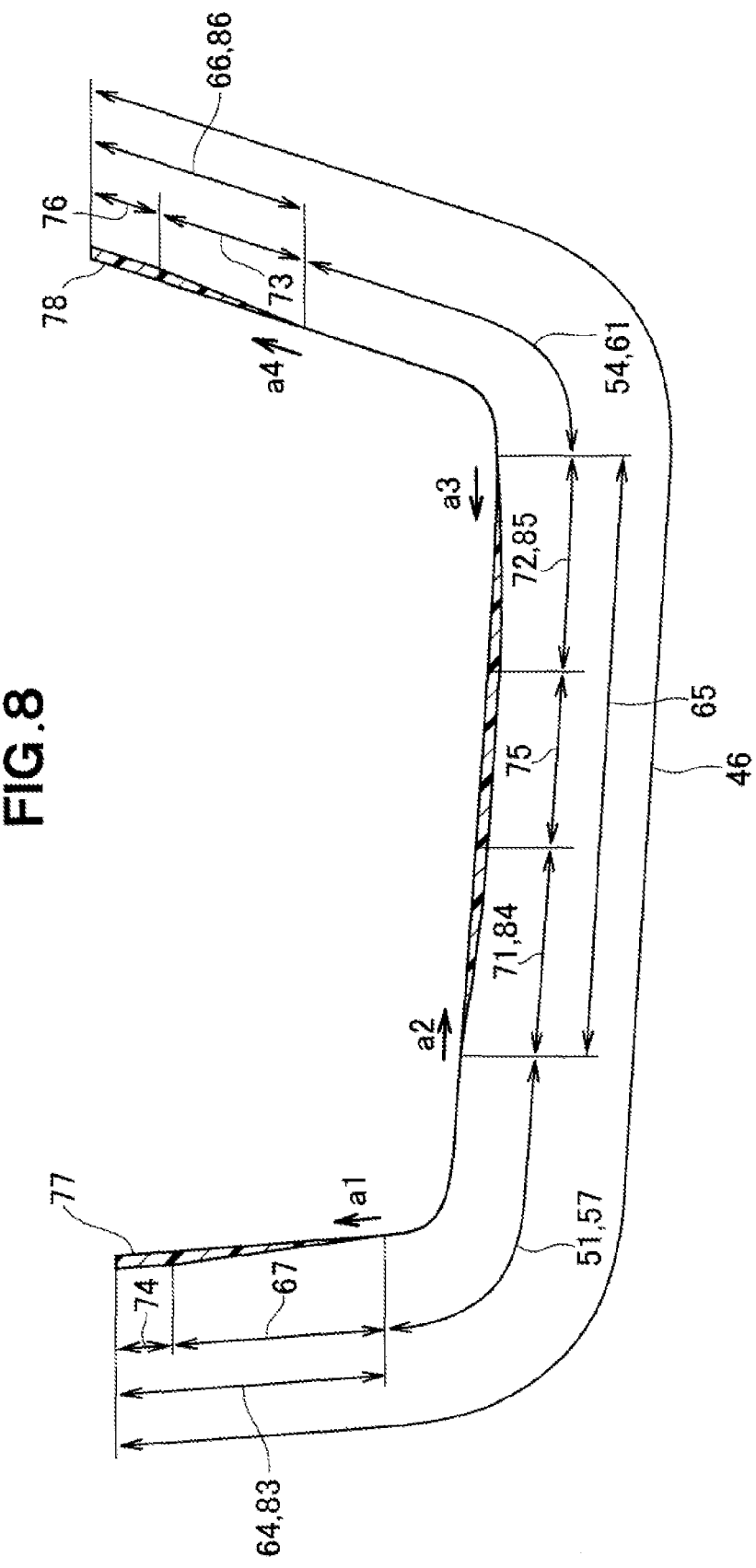
FIG. 8 is a cross-sectional view taken along line 8-8 of FIG. 7.

As illustrated in FIGS. 7 and 8, the upper lip 44 and the lower lip 45 have seal outer wall thickness adjusting areas 83, 84, 85, and 86 (illustrated with vertical hatching) continuous with the seal close contact face portions 51 (the front upper seal close contact face portion 52 and the front lower seal close contact face portion 53) and the seal close contact face portions 54 (the rear upper seal close contact face portion 55 and the rear lower seal close contact face portion 56).

The seal outer wall thickness adjusting areas 83, 84, 85, and 86 have gradually changing wall thickness portions 91, 92, 93, and 94 (illustrated with vertical hatching) having wail thicknesses gradually increasing in directions (directions of arrows a1 to a4) away from the seal close contact face portions 51 (the front upper seal close contact face portion 52 and the front lower seal close contact face portion 53) and the seal close contact face portions 54 (the rear upper seal close contact face portion 55 and the rear lower seal close contact face portion 56) and toward the body portion 43 and intermediate gradually changing wall thickness portions 95, 96, and 97 (illustrated with horizontal hatching) continuous with the gradually changing wall thickness portions 91, 92, 93, and 94 and having wall thicknesses gradually increasing toward the body portion 43.

The gradually changing wall thickness portions 91, 92, 93, and 94 (illustrated with the vertical hatching) have boundary portions 98 with the seal close contact face portions 51 and 54 and the boundary portions 98 form triangular areas (illustrated with the vertical hatching) substantially orthogonal to the tip ends 46 and 47.

Next, the outer panel 37 of the center pillar 21 and the door seal cover 34 will be described in detail.

As illustrated in FIGS. 3 and 4, the center pillar 21 includes the outer panel 37 and an inner panel 101 and these panels 37 and 101 form a closed sectional shape. The inner panel 101 has a hat-shaped section with flanges 102 and the flanges 102 are coupled to the outer panel 37 with an opening 103 facing the outer panel 37.

The outer panel 37 has a hat-shaped section with a flange 105. The outer panel 37 includes a body wall portion 106, a front wall portion 107 continuous with the body wall portion 106, a rear wall portion 108 continuous with the body wall portion 106, and the flange 105. The flange 105 includes a front flange 105a and a rear flange 105b.

The front flange 105a has the front door opening edge 81 of the front door opening portion 25 and the front door opening seal 31 is mounted to the front flange 105a. The front door opening seal 31 has a grasping portion 111 at the front door opening edge 81 and a bulging close contact portion 112 formed to be continuous with the grasping portion 111 and comes in close contact with the front door 28. The bulging close contact portion 112 comes in contact with the front end 77 of the door seal cover 34 mounted to the outer panel 37 in such a manner as to hide the front end 77.

The rear flange 105b has the rear door opening edge 82 of the rear door opening portion 26 and the rear door opening seal 33 is mounted to the rear flange 105b. The rear door opening seal 33 has a grasping portion 114 at the rear door opening edge 82 and a bulging close contact portion 115 formed to he continuous with the grasping portion 114 and comes in close contact with the rear door 32. The bulging close contact portion 115 comes in contact with the rear end 78 of the door seal cover 34 mounted to the outer panel 37 in such a manner as to hide the rear end 78.

As is already described, the outer panel 37 has the outer upper member 41 from which the outer lower member 42 continues. As illustrated in FIGS. 3 to 6, the outer upper member 41 has an upper joint portion 117 deformed by deforming a lower portion of the outer upper member 41 toward the vehicle interior (arrow a6). At the upper joint portion 117, the body wall portion 106 is deformed distance a toward the vehicle interior (arrow a6). The outer lower member 42 has a lower joint portion 118 formed by deforming an upper portion of the outer lower member 42 toward the vehicle interior (arrow a6). At the lower joint portion 118, the body wall portion 106 is deformed distance βtoward the vehicle interior (arrow a6).

By laying the upper joint, portion 117 on the lower joint, portion 118 and coupling them, the coupling recessed portion 35 is formed. The door seal cover 34 is stuck to the upper joint, portion 117 of the coupling recessed portion 35 by using double-sided tape 121.

As illustrated in FIGS. 5 to 8, the door seal cover 34 includes the body portion 43, the upper lip 44, and the lower lip 45. The upper lip 44 and the lower lip 45 are substantially symmetric about a center (a center line 122 of FIG. 7) of the body portion 43.

As illustrated in FIG. 7, the upper lip 44 includes the front upper seal close contact face portion 52, the rear upper seal close contact face portion 55, the gradually changing wall thickness portions 91, 92, 93, and 94 (vertical hatching), and the intermediate gradually changing wall thickness portions 95, 96, and 97 (horizontal hatching).

The gradually changing wall thickness portions 91, 92, 93, and 94 form the triangular areas. The intermediate gradually changing wall thickness portions 95 and 97 form the substantially triangular areas. The intermediate gradually changing wall thickness portion 96 has a triangular area and forms an area formed by combining the triangular shapes and the rectangular shape.

The front upper seal close contact face portion 52 and the rear upper seal close contact face portion 55 have thicknesses gradually increasing toward the body portion 43. For example, the thickness gradually increases from the tip end 57 having such a thickness as to be able to secure watertightness which is an extremely small thickness (substantially close to 0 mm) to the body portion 43 having a thickness of 2 mm (FIG. 5). A boundary portion 124 between the gradually changing wall thickness portion 92 and the intermediate gradually changing wall thickness portion 96 has a thickness gradually increasing toward the body portion 43. For example, the thickness gradually increases from the tip end 46 of the intermediate gradually changing wall thickness portion 96 having a thickness of 0.5 mm to the body portion 43 having a thickness of 2 mm.

Boundary portions 125, 126, and 127 between the gradually changing wall thickness portions 91, 93, and 94 and the intermediate gradually changing wall thickness portions 95, 96, and 97 have thicknesses gradually increasing from 0.5 mm to the body portion 43 having the thickness of 2 mm similarly to the boundary portion 124.

The intermediate gradually changing wall thickness portions 95, 96, and 97 have thicknesses changing from the tip end 46 having the thickness of 0.5 mm to the body portion 43 having the thickness of 2 mm. The lower lip 45 has the same structure as the upper lip 44.

Next, a mounting procedure of the door seal cover 34 will be briefly described and a function of the door seal cover 34 will be described.

As illustrated in FIG. 9, when the door seal cover 34 is mounted to the outer panel 37 of the vehicle body pillar 21 in a direction of an arrow b1, the tip ends (the remaining tip ends (34 and 66) near the front end 77 and the rear end 78 of the door seal cover 34 are not entangled in directions of arrows b2 and b3.

In other words, because only the tip ends (the front upper tip end 57, the front lower tip end 58, the rear upper tip end 61, and the rear lower tip end 62) of the seal close contact face portions 51 (the front upper seal close contact face portion 52 and the front lower seal close contact face portion 53) and the seal close contact face portions 54 (the rear upper seal close contact face portion 55 and the rear lower seal close contact face portion 56) illustrated in FIG. 7 have thicknesses (e.g., thicknesses of 0.1 mm) without steps and the other portions (the gradually changing wall thickness portions 91, 92, 93, and 94 and the intermediate gradually changing wall thickness portions 95, 96, and 97) illustrated in FIG. 7 are formed to be thick-walled, the tip ends (the remaining tip ends 64 and 66) are not deformed and entangled when the door seal cover 34 comes in contact with the outer panel 37.

Furthermore, because the other portions (the gradually changing wall thickness portions 91, 92, 93, and 94 and the intermediate gradually changing wall thickness portions 95, 96, and 97) illustrated in FIG. 7 are thick-walled, the door seal cover 34 can be maintained in the U-shape, which facilitates a mounting operation for mounting the door seal cover 34 to the outer panel 37, having the U-shaped section, of the vehicle body pillar 21.

The remaining tip ends 64, 65, and 66 illustrated in FIG. 7 include the gradually changing tip end thickness portions 67, 71, 72, and 73 having the thicknesses gradually increasing in the directions away from the tip ends (the front upper tip end 57, the front lower tip end 58, the rear upper tip end 61, and the rear lower tip end 62) of the seal close contact face portions 51 and 54 and the constant tip end thickness portions 74, 75, and 76 continuous with the gradually changing tip end thickness portions 67, 71, 72, and 73 and having constant thicknesses. Therefore, the thicknesses of the tip ends 46 and 47 of the door seal cover change smoothly from the tip ends (the front upper tip end 57, the front lower tip end 58, the rear upper tip end 61, and the rear lower tip end 62) having the thicknesses without steps to the constant tip end thickness portions 74, 75, and 76 and the thicknesses of the tip ends 46 and 47 look uniform, which improves appearances of the tip ends 46 and 47 and areas around the tip ends 46 and 47.

Industrial Applicability

The vehicle body side structure according to the invention is suitable for use on automobiles.

REFERENCE SIGNS LIST

12 . . . vehicle body, 13 . . . vehicle body side portion, 21 . . . vehicle body pillar, 23 . . . roof, 28 front door, 31 . . . door opening seal (front door opening seal), 32 . . . rear door, 33 door opening seal (rear door opening seal), 34 . . . door seal cover, 35 coupling recessed portion, 36 outer face of vehicle body pillar, 37 . . . outer panel, 41 . . . outer upper member, 42 . . . outer lower member, body portion, 44 . . . upper lip, 45 . . . lower lip, 46 . . . tip end of upper lip, 47 . . . tip end of lower lip, 48, 49 . . . door-side seal member, 51, 54 . . . seal close contact face portion . . . 57 tip end of seal close contact face portion (front upper tip end), 58 . . . tip end of seal close contact face portion (front lower tip end), 61 . . . tip end of seal close contact face portion (rear upper tip end), 62 . . . tip end of seal close contact face portion (rear lower tip end), 64, 65, 66 . . . remaining tip end, 67, 71, 72, 73 gradually changing tip end thickness portion, 74, 75, 76 . . . constant tip end thickness portion, 77 . . . front end, 78 . . . rear end, 81 . . . front door opening edge, 82 . . . rear door opening edge, 83, 84, 85, 86 . . . seal outer wall thickness adjusting area, 91, 92, 93, 94 . . . gradually changing wall thickness portion, 95, 96, 97 . . . intermediate gradually changing wall thickness portion, 98 . . . boundary portion

The invention claimed is:

1. A vehicle body side structure in which an outer panel, forming an outer face, of a vehicle body pillar supporting a roof of a vehicle body is formed by coupling an outer lower member to an outer upper member, the vehicle body side structure comprising:
   a coupling recessed portion where the outer lower member is coupled to the outer upper member; and
   a door seal cover for covering the coupling recessed portion,
   wherein the door seal cover has a U-shaped section and includes a U-shaped body at a central portion, a U-shaped upper lip extending upward from the body portion, and a U-shaped lower lip extending downward from the body portion,
   the upper lip and the lower lip have tip ends to be respectively laid on the outer upper member and the outer lower member, of the tip ends, tip end portions of seal close contact face portions to be held in close contact with door-side seal members of a door of the vehicle body are formed to have a non-stepped thickness so as to prevent the door-side seal member from separating from the outer upper member and the outer lower member while remaining tip end portions are formed to have a stepped thickness.

2. The vehicle body side structure according to claim 1, wherein the outer panel has a U-shaped section and the upper lip and the lower lip have thicknesses gradually reducing from the body portion toward the tip ends.

3. The vehicle body side structure according to claim 1, wherein the remaining tip end portions include a gradually changing tip end thickness portion having a thickness gradually increasing in a direction away from the tip end of the seal close contact face portion and a constant tip end thickness portion continuous with the gradually changing tip end thickness portion and having a constant thickness.

4. The vehicle body side structure according to claim 1, wherein the door seal cover has a front end and a rear end continuous with the tip end of the upper lip and continuous with the tip end of the lower lip, the front end and the rear end covered with respective door opening seals provided to a front door opening edge and a rear door opening edge of the vehicle body.

5. The vehicle body side structure according to claim 1, wherein
- the upper lip and the lower lip have seal outer wall thickness adjusting areas continuous with the seal close contact face portion,
- each of the seal outer wall thickness adjusting areas has a gradually changing wall thickness portion having a wall thickness gradually increasing in a direction away from the seal close contact face portion and toward the body portion and an intermediate gradually changing wall thickness portion continuous with the gradually changing wall thickness portion and having a wall thickness gradually increasing toward the body portion, and
- the gradually changing wall thickness portion has a boundary portion with the seal close contact face portion, the boundary portion forming a triangular area substantially orthogonal to the tip end.

* * * * *